June 6, 1944.  K. F. NYSTROM ET AL  2,350,567
RAILROAD CAR TRUCK
Filed Sept. 11, 1941  2 Sheets-Sheet 2
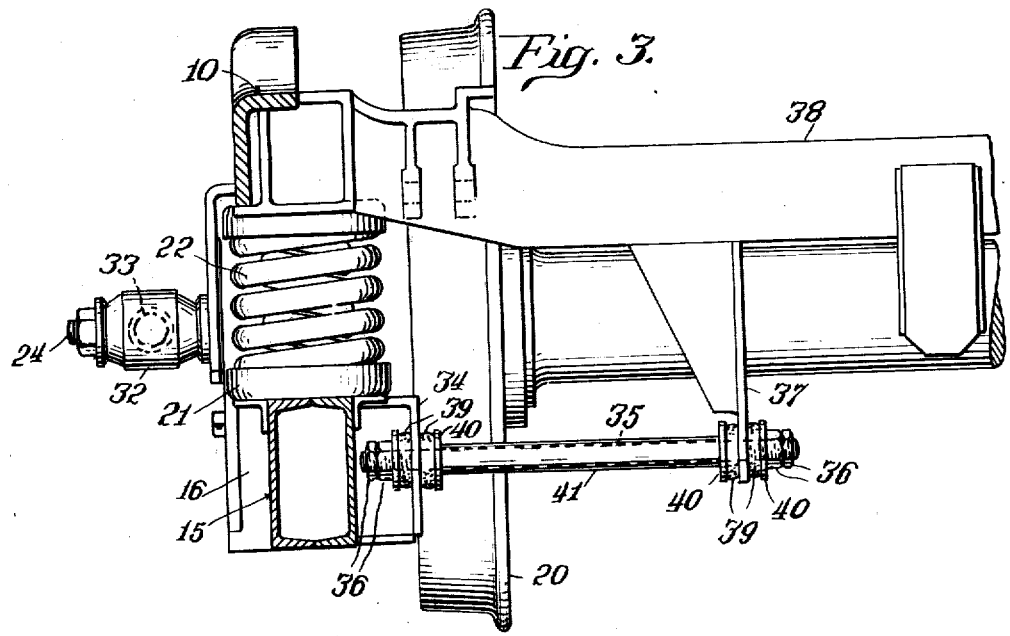
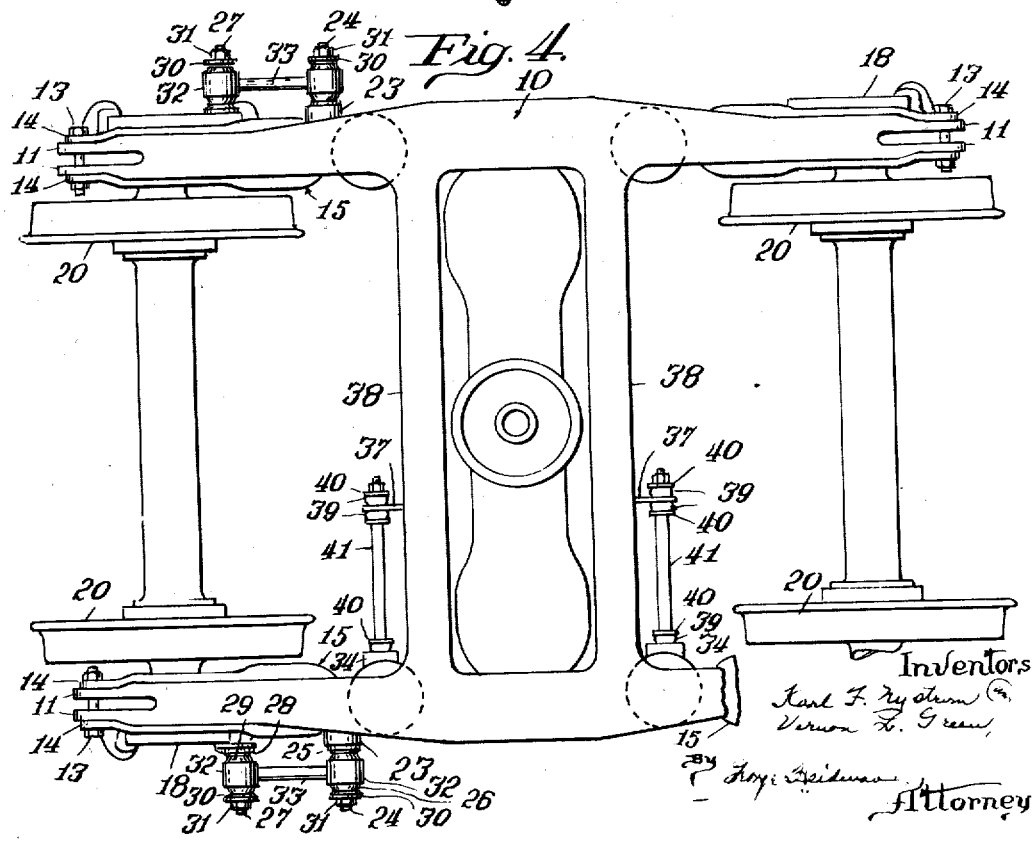

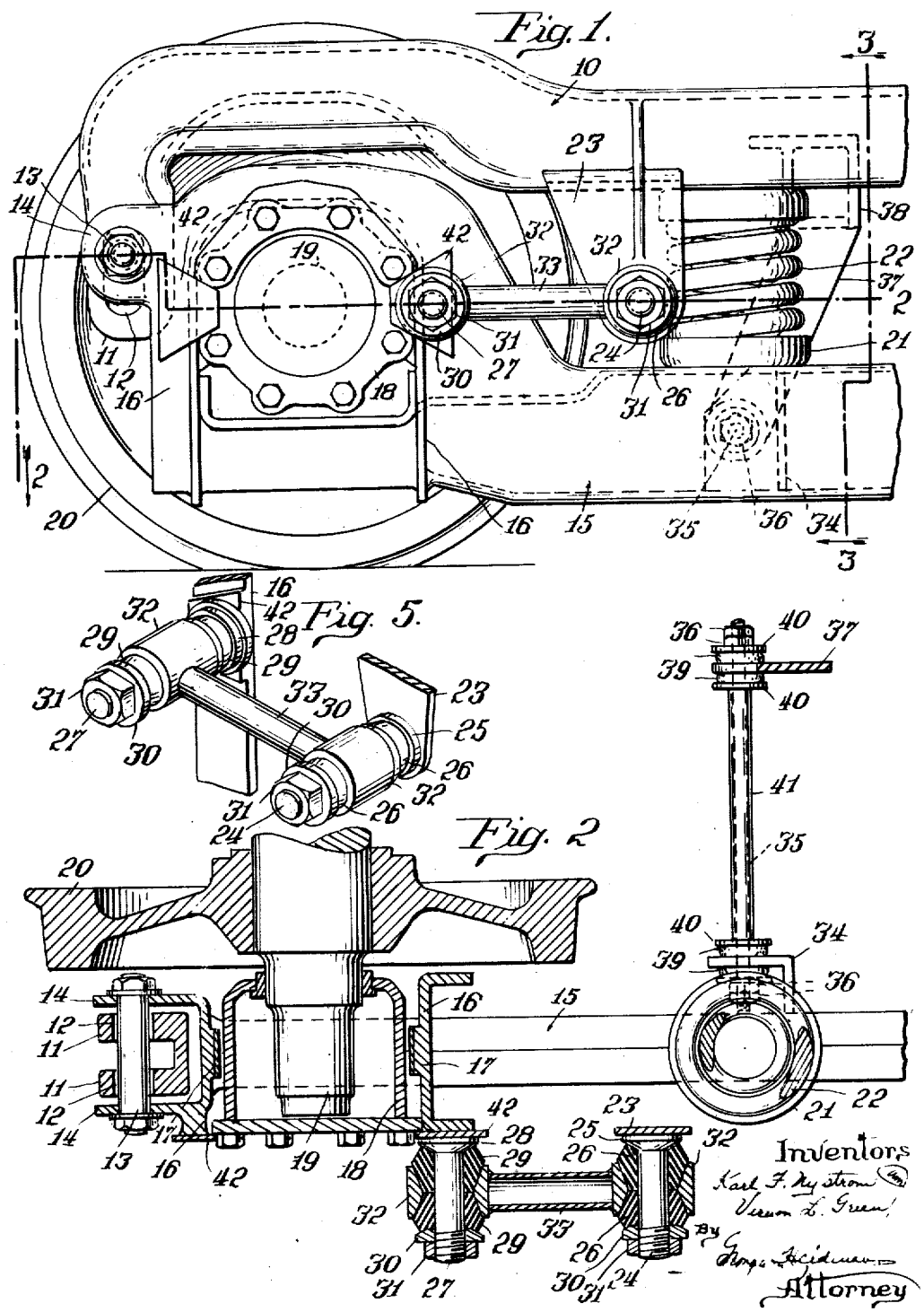

Patented June 6, 1944

2,350,567

UNITED STATES PATENT OFFICE 2,350,567

RAILROAD CAR TRUCK

Karl F. Nystrom and Vernon L. Green, Milwaukee, Wis.

Application September 11, 1941, Serial No. 410,354

3 Claims. (Cl. 105—194)

Our invention, more particularly stated, relates to improvements in four wheel trucks of railroad passenger cars, provided with roller bearings, designed to overcome the difficulties encountered with trucks as heretofore constructed.

The invention contemplates the provision of a truck of improved riding quality and wherein metallic contact between the truck frame and the equalizers is eliminated and greater resiliency provided; namely a construction wherein the conventional truck pedestals are eliminated and the equalizers provided with yokes which constitute the outer housings for the roller bearings of the truck axles, and the equalizers resiliently connected or linked to the truck frame; hence a construction which eliminates the undesirable wear heretofore encountered between the outer bearing housings and the equalizers and between the outer housing and the truck pedestals.

The objects and advantages encountered, as well as other advantages inherent in the invention, will be readily comprehended from the detailed description of the accompanying drawings wherein:

Figure 1 is a side elevation of one end of a railroad car truck with our invention applied thereto.

Figure 2 is a longitudinal sectional view taken substantially on the line 2—2 of Figure 1 and viewed in the direction of the arrows.

Figure 3 is a transverse sectional view taken on the offset line 3—3 of Figure 1, looking in the direction of the arrows.

Figure 4 is a plan view of a four wheel truck illustrating our invention applied, with a portion at one end of the truck broken away.

Figure 5 is a detail perspective view of one of the longitudinal links and its connections, with portions of an equalizer and a frame bracket being shown.

In car trucks as heretofore employed, the conventional type of equalizer was employed and the truck frame provided with the usual pedestals in which the Timken type of outer and inner roller bearing housings were slidably mounted. Experience with these trucks disclosed that considerable wear occurred between the outer bearings of the axle roller bearings and the equalizer and also between the outer housings and the truck pedestals; and that as this wear developed or increased, the riding qualities of the truck were greatly impaired and maintenance cost was materially increased.

Our improved construction designed to overcome these difficulties contemplates the elimination of the conventional truck pedestals and consequently the points of wear mentioned; providing a combined equalizer with outer housings in a single piece structure which is yieldingly connected with the truck frame through the medium of non-metallic compressible elements.

The construction of the frame and the equalizer at both ends and on opposite sides of the truck are substantially similar, as disclosed in the plan of the truck in Figure 4.

In the particular exemplification of the invention, the truck frame 10 at its end is provided with a downwardly disposed portion 11 which is shown preferably bifurcated, see Figure 2; this depending end portion being provided with a vertical slot 12 adapted to receive a pin 13 secured in the bifurcated lobe 14 at the end of the equalizer 15 and permits relative vertical movement between the frame and equalizer without contact with one another.

The truck frame 10 is not provided with the conventional or usual pedestals for receiving the roller bearing housings, but instead we provide the equalizer 15 adjacent its ends with upstanding yokes one of which is shown at 16 in the nature of inverted U-shape members, preferably of channel cross-section as shown in Figure 2, and formed integral with the equalizer 15 to constitute a single unit; the yoke being provided with flat inner side faces which are shown preferably provided with bosses or load pads as at 17, see Figure 2. These load pads 17 provide lateral bearing surfaces for the sides of the main or inner roller bearing housing 18 and permit relative vertical movement between the equalizer yokes and the bearing housings; the journal bearing generally illustrated being of the well-known Timken roller bearing type and hence its specific construction and mounting on the end of the journal 19 to the outside of the truck wheel 20 need not be entered into.

The equalizer 15 is provided with the usual spring seat at 21 for the coil spring 22 whose upper end is mounted in a similar seat arranged on the lower face of the truck frame 10.

The truck frame 10, at a suitable distance removed from the bearing receiving yoke 16 of the equalizer and on its outer side is provided with a depending bracket 23, formed integral with or otherwise rigidly secured thereto, and the lower end of the bracket provided with a pin 24 whose inner end is provided with a beveled head or washer 25 for properly compressing the rubber element or bushing 26 through which the pin 24 extends.

One leg or side of the yoke 16 of the equalizer is provided with a similar pin 27, arranged substantially in horizontal alignment with pin 24, and also provided with a beveled head or washer 28; pin 27 being also provided with a rubber element or bushing 29. The outer ends of both pins 24 and 27 are preferably threaded as shown in Figure 2 and provided with tapered washers 30, nuts 31 which, when screwed inwardly on the pins, will compress the rubber bushings 26 and 29.

The pins with the rubber bushings are adapted to receive the hubs 32, 32, which are preferably internally provided with oppositely tapered surfaces, as shown in Figure 2, which coact with the washers in placing the rubber elements 26, 29 under compression.

The hubs 32 are united by a link 33, shown in the form of a metal tube with its ends integrally united with the hubs 32, as by welding. The link 33 swingingly connects the equalizer 15 and the truck frame 10 and constitutes a draw bar between the wheel-journal receiving yoke of the equalizer and the truck frame; it being found sufficient in a truck of the character shown to merely employ one draw bar or link to each equalizer or truck side to take care of the longitudinal pulls; a similar equalizer and link being employed on the other side.

The equalizer 15 on one side of the track is provided with a pair of longitudinally spaced similar brackets 34 (only one being shown) preferably of the angular formation shown in Figures 2 and 3, and each apertured to receive one end of a transverse rod or link 35 whose ends are preferably threaded to receive nuts 36. The other end of each rod 35 extends through an aperture in each downwardly disposed bracket 31 secured to or formed integral with the adjacent transom member 38 of the truck frame. As shown in Figure 4, each transom 38 is provided with a bracket 37 to cooperate with the brackets secured to one of the equalizers 15, namely the equalizer at the bottom of Figure 4, which may be called the master equalizer; the equalizer at the opposite side of the truck, with the exception of the brackets 34 and links 35 being the same.

The rods 35 on opposite sides of brackets 34 and 37 are provided with rubber bushings 39, and washers 40, and the portion of each rod 35 intermediate the respective brackets 34 and 37 is provided with a metal tube or sleeve 41, whose ends engage the inner washers 40. It is apparent that by screwing up nuts 36 the rubber bushings or elements 39 will be compressed and that any relative lateral movement between the truck frame and the master equalizer will be yieldingly transmitted from one to the other and absorbed by the rubber elements; while the relative longitudinal and vertical movements between the equalizers and the truck frame will be yieldingly transmitted through the two links 33 (one on each side of the truck) and be absorbed by the rubber elements 26, 29 arranged in the hub portions of links 33.

The yoke or bearing housing receiving portions 16 of the equalizer members 15 on their outer sides are preferably provided with a pair of stop plates or lugs 42, 42, see Figure 1, which overlap the housings and prevent outward movement of the journal bearing housings 18.

The frame of our improved truck, as viewed in plan, is of H-formation consisting of the two side members united intermediate the ends by the transom members 38.

The exemplification is believed to be the best embodiment of the invention but certain structural modifications may be made without, however, departing from the spirit of our invention as defined in the appended claims.

What we claim is:

1. In a railroad car truck, the combination of a pedestalless truck frame with longitudinally disposed side members provided with depending brackets; equalizer beams arranged at the truck sides beneath the frame with upstanding journal bearing receiving yokes at their ends provided on their outer sides with bearing housing stop members; a longitudinally extending pull link pivotally connected with one of said yokes of each equalizer beam and said depending bracket, the ends of the link having enlarged conical openings therethrough; outwardly disposed pins secured, respectively, to the yoke and to the depending bracket and disposed through the openings in the ends of the link; resilient bushings arranged in the link-openings and disposed about the pins; and means at the opposite ends of the pins whereby the bushings are placed under compression.

2. In a railroad car truck whose journals are provided with bearing holding housings, the combination of an open ended pedestalless truck frame composed of a pair of side members connected intermediate their ends by transom members and having downwardly extending ends provided with vertical slots, said side members each having a downwardly disposed pin carrying bracket at a point removed from the ends of said members; an equalizer unit at each side of the truck composed of a horizontally disposed beam terminating at its ends in vertically disposed bearing housing receiving yokes and with bifurcated apertured extensions adapted to receive the downwardly extended ends of the frame side members therebetween, each equalizer unit having a horizontally disposed immovable pin; a longitudinally disposed link whose ends terminate in horizontally disposed hubs adapted, respectively, to receive the pins of the side member brackets and of the equalizer unit about which the link may have vertical oscillatory movement, said hubs having oppositely tapered inner surfaces; compressible shock absorbing elements arranged in said hubs about said pins; and adjustable means on said pins whereby said elements may be placed under compression; and transversely disposed rods between the intermediate portion of one of the equalizer units and the frame transom members, the ends of said rods having shock absorbing connections with said equalizer member and the transom members.

3. In a railway truck, an axle and wheel, a journal box carried thereby, an equalizer supported upon the journal box and extending longitudinally of the truck, the equalizer and journal box being movable together vertically of the truck and being held against relative movement longitudinally of the truck, a load carrying truck frame spring-supported on the equalizer and free of association with the journal box except through the equalizer, and an elongated anchor rod extending transversely of the truck and connected at its end portions to the equalizer and to the load carrying frame to hold the equalizer and load carrying frame against substantial movement relative to each other transversely of the truck but accommodating their movement relative to each other in a vertical direction.

KARL F. NYSTROM.
VERNON L. GREEN.